March 27, 1934.  H. W. WEBB  1,952,301
FLEXIBLE SHAFT
Filed Jan. 9, 1930

Hartwell W. Webb
INVENTOR

Patented Mar. 27, 1934

1,952,301

UNITED STATES PATENT OFFICE 1,952,301

FLEXIBLE SHAFT

Hartwell W. Webb, Leonia, N. J.

Application January 9, 1930, Serial No. 419,723

3 Claims. (Cl. 64—30)

This invention relates to flexible shafts such as are used to convey power or effect distant control or indication by rotation about a tortuous axis, and particularly to those composed of super and subjacent layers, wound or formed in alternately opposite hand, of helical metal strands. Such shafts are of two general classes; one with a hollow quasi-tubular helical innermost member, and the other with a solid cylindrical metal core.

The present invention consists of a central member of new and improved construction, functioning as a flexible core, and a new and improved shaft of improved construction, embodying such a central member as its core, and possessing certain advantageous characteristics of each of these two classes. A brief summary of the characteristics of the two classes will clarify the disclosure of the nature and pertinence of my invention.

A shaft with solid core has the intrinsic advantage of high torsional rigidity and of small phase lag under load by reason of its rigid central member, but has the disadvantage of considerable power losses through internal friction under load and of whip from non-uniform rotation if the core suffer distortion or be of imperfect circular section, while the radius of the arc of effective operation is sharply limited by tension and compression strains set up within the core and its useful life is limited by metal fatigue from this cause.

The hollow shaft has low power losses from internal friction owing to its construction with space between super, sub and adjacent strands, is relatively free from whip and distributes its stresses by mutual adjustment of contiguous layers to permit rotation in a loop of small radius of arc with long life and without metal fatigue. As at present constructed, it lacks torsional rigidity, will not carry temporary overload without elongating and has relatively large phase lag under load.

My particular objective is a shaft combining the high torsional rigidity and small phase lag under load of the solid core construction with the several advantages of the hollow central construction. This I accomplish by employing a core member of a construction heretofore unknown in the art, consisting of a helically disposed quasi-tubular member with a bore smaller in diameter in proportion to the diameter of the core member, than has heretofore been known in the art. The term quasi-tubular is used to describe a cylindrical helically formed structure with continuous spiral cleavage or cleavages between its bore and circumference. In my coincident application Serial Number 419,722, filed January 9, 1930, I disclose and claim means and processes by which the core member and the shaft in which it is embodied may be produced.

In the drawing, Fig. 1 represents a partially unwrapped shaft shown sectioned in an axial plane at the right. A helically disposed rectangular strip 1 of ribbon material forms the core member. The partially unwrapped layers 2, 3, and 4 show how the core is covered by alternate tension and compression members of opposite hand or direction of wind.

Fig. 2 represents a similar shaft in which a tubular construction of four wire strands 5 form the core member and are similarly covered by layers 6, 7, and 8 to form the completed shaft.

Figure 3:
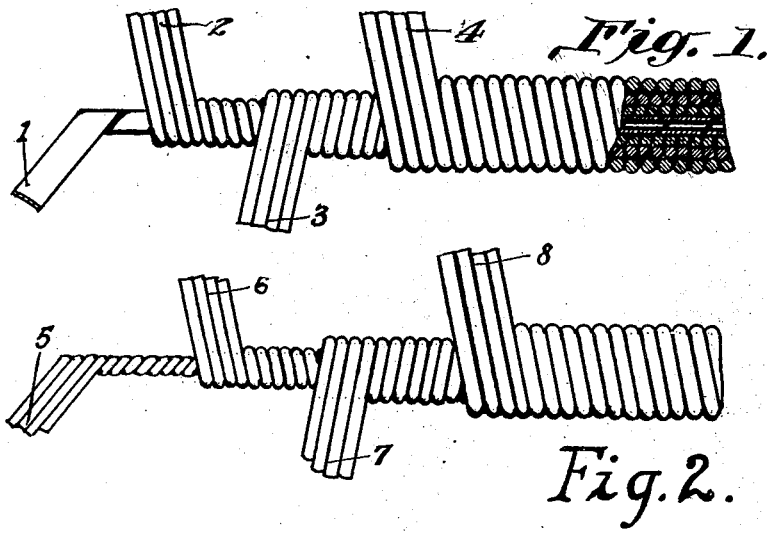
Fig. 3 shows a diagrammatic sectional view of Fig. 1 in a plane perpendicular to the axis of the shaft.
Figure 4:
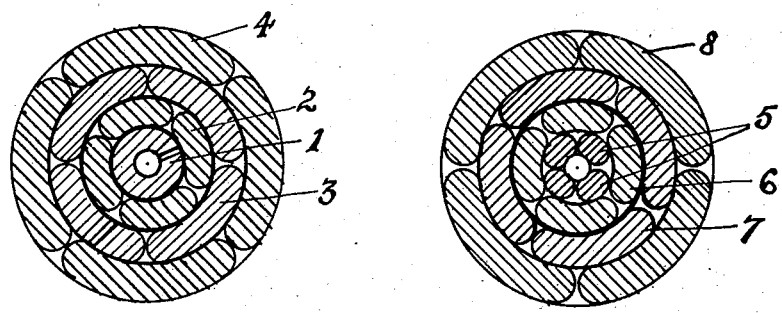
Fig. 4 shows a similar sectional view of Fig. 2.

The structures represented in the drawing differ from those hitherto used in the art, not only in the relatively small diameter of the bore as proportioned to the outside diameter of the core members, 1 of Fig. 1 and Fig. 3, and 5 of Fig. 2 and Fig. 4, but also in the possession of improved physical characteristics, acquired during and consequential on, the process of producing the core member.

The nature of these characteristics will be better explained by briefly describing the process which is more fully disclosed in my coincident application of even date.

A helical structure of cylindrical form is coiled or wound from suitable spring stock customarily used for the innermost layer of shafts, of the smallest practical bore the properties of the stock will admit without subjecting it to deteriorating strains, by either of the methods well known in the art. If coiled on an air core the ratio of bore diameter to outside diameter of the helix will be larger than if wound on a solid cylindrical mandrel which is subsequently removed. By the latter plan, which is the usual method, shorter lengths are obtained, which may have as low a ratio of bore diameter to outer diameter as 1 to 3 in case a very high grade mandrel is used. By the coiling method long continuous lengths may be obtained of a ratio not practically less than 1 to 2½.

The helical structure is drawn, preferably with simultaneous torsion, through a die of circular aperture. Torsion may be effected either by rotating the die or the emergent product, but always in a direction to close the helix or helices and afford traction through the die in a spiral course preferably running lengthwise with the strand or strands of the helix. Consequential effects of passage through the die are; extension with elongation of pitch of helix, reduction of diameter, both external and bore diameter, deformation of component strand or strands to section presenting more nearly cylindrical surface in the emergent core member and closer fibre and increased hardness with higher tensile strength in the areas affected by pressure of the die in passage through it. Such a core member has, and confers on the shaft embodying it as an innermost member, the properties of high torsional rigidity and small phase lag under load inversely as the ratio of diameter of bore to diameter (outside) of core member. This ratio can be made very small, 1 to 6 or even less, by progressive reducing operations, until the bore is almost eliminated and the core member then approaches the properties of a solid cylinder. The objective of the present invention is more adequately attained by a larger ratio if the shaft is intended to partake of the advantages and lack the disadvantages of both hollow and solid core types. As a matter of fact the chief merit of my invention lies in the facility with which a shaft can be designed to meet definite specifications for particular uses, thus bridging the gap between the two known types, and extending well within the fields now occupied by each of them. A ratio of 1 to 4 would be about a mean value to balance the properties of the two types which it is desired to retain with practical elimination of those it is desired to suppress. A resultant improvement and advance beyond the scope of the known art is attained where the ratio is less than 1 to 3 for short lengths or less than 1 to 2½ for long continuous lengths and my invention might be said to begin at these ratio proportions of diameter of bore to diameter of the processed core member, both for the core member and the shaft in which it is embodied. I do not limit the scope of my invention to any particular number of strands nor to any particular section of strand, nor is it essential that the enveloping layers be applied or treated in any particular manner that is not now well known in the art. I consider it essential that the core member shall have been reduced from a larger diameter with a coincident extension in axial pitch and length in order that it may have the physical characteristics specified. For convenience the ratios between bore diameter and whole or outside diameter of the core member may be appropriately expressed in volumetric terms. For instance the ratio of 1 to 3 may be given as follows; the bore occupies 1/9 the volume of the core member.

I claim:

1. A flexible shaft comprising a hollow core formed of ribbon material and having coils superposed thereon and laid in alternately opposite directions.

2. A flexible shaft comprising a core of ribbon material coiled to form a tube, with the approximal edges of the ribbon relatively spaced apart and having stranded coils laid thereon in alternately opposite directions.

3. A flexible shaft comprising a hollow core formed of coiled ribbon material the coils of which assume a minimum angle to the shaft axis and having superposed thereon stranded coils laid in alternately opposite directions and disposed at a maximum angle to said axis.

HARTWELL W. WEBB.